Patented Mar. 20, 1928.

1,663,160

UNITED STATES PATENT OFFICE.

CARLETON ELLIS, OF MONTCLAIR, NEW JERSEY.

COATING AND IMPREGNATING MEDIUM.

No Drawing.    Application filed December 7, 1920.  Serial No. 428,852.

This invention relates to a composition of matter and relates especially to a composition adapted for coating purposes to afford a surface which is relatively resistant to acids, alkalis and the like.

The composition comprises a resinous base or bases made by reacting on a phenol with sulphur chloride forming a resinous substance whose consistency and properties varies with the content of combined sulphur.

Sulphur chloride may be used in its several forms such as the monochloride, the dichloride and also sulphur chloride containing either an excess of sulphur or an excess of chlorine. In some cases a mixture of sulphur and chlorine or of sulphur chloride, sulphur and chlorine may be employed. Other halogens such as bromide could of course be used but are too expensive for the ordinary commercial usages of resinous material, however for example sulphur bromide could be used in preparing material intended for pharmaceutical purposes.

The phenolic body employed comprises ordinary phenol or carbolic acid, cresol in its various forms ortho, meta or para, and mixtures of these isomers, xylenol and higher homologues of phenol, naphthol and its homologues and various mixtures of these several phenolic bodies. In the following description ordinary phenol is taken as a type but it should be understood that such use is for illustrative purposes only and that other phenols may be similarly employed.

Ordinary phenol may be obtained in a state of high commercial purity as a white crystalline substance which reacts readily with sulphur chloride forming a series of resinous bodies depending upon the amount of sulphur chloride employed. These resins will vary in consistency from liquid, readily flowing syrups to hard brittle products and the melting point will likewise vary from products melting at or below room temperature to those which are practically infusible or at least have a high melting point which is indefinite in its character. Between the two extremes are resins which in each case probably represent an average of values or properties of mixtures of varying sulphur content and which have different properties according to the degree to which the phenol has been treated with sulphur chloride. For example, a resin made by treating phenol with its own weight of sulphur chloride, (that is 100% of the latter) is of a light yellow to light brown color and of the consistency of say, molasses. That made with 150% of sulphur chloride is a sticky solid; with 200% of sulphur chloride (or twice the weight of the phenol) the product is a light yellow or light brown solid resin; with 250%, the product is a hard resin, and with 300% to 350% still harder, or at least having a high melting point as a general rule. A solid resin is also produced with about 275% of sulphur chloride. With 400% of sulphur chloride reaction is ordinarily not complete; excess of sulphur chloride remaining and reacting slowly over a period of days or weeks causing expansion and foaming of the resin with the constant evolution of hydrochloric acid. The resin made with 400% sulphur chloride is moreover considerably softer than that made with 350%. In referring to these properties it may be noted that the resin is prepared in the above instances by melting the phenol and running in the sulphur chloride as rapidly as is feasible, consistent with the foaming which occurs due to the evolution of hydrochloric acid. The mass is allowed to heat spontaneously when preparing small batches but in case of larger batches a water jacket may be used for cooling and the temperature kept below that at which any discoloration or carbonization would occur. In case of large batches also the temperature may be modified by the introduction of solvents especially those which are not affected by sulphur chloride, benzol or toluol being useful for the purpose.

The hydrochloric acid which is evolved is anhydrous and may be used for preparing anhydrous compounds or as a condensing agent or it may be passed into water to made the ordinary solution of hydrochloric acid. In this case it is desirable to pass the gas through a purifier to remove any traces of sulphur chloride which may be carried over. When the sulphur chloride falls into the molten phenol the reaction is violent and the phenol is thrown about violently so that care should be taken to have the vessel enclosed or the operator properly protected.

The violence of the reaction is reduced by adding a solvent such as benzol to the sulphur chloride.

Whenever possible I prefer to carry out the operation without the use of solvents if the product desired is a solid resin as this eliminates the step of evaporation of the solvent.

The reaction appears to be that of linking up the phenol groups by means of sulphur with the elimination of hydrogen and chlorine from the reaction mass as hydrochloric acid.

The percentage of sulphur in the resin product as stated, varies with the amount of sulphur chloride used, and products containing as high as 60% or more of combined sulphur may be obtained by using between 300 and 400% of sulphur chloride. The solubility in various solvents varies with the content of sulphur and also on another factor, namely the time of exposure to the hydrochloric acid fumes. Resins containing a low percentage of sulphur as for example those made up with 150% of sulphur chloride usually are readily soluble in alcoholic solvents such as methyl and ethyl alcohol, denatured alcohol, acetone and higher ketones, methyl and ethyl acetates etc. They also dissolve readily in benzol and toluol and in mixtures of hydrocarbons such as benzol or its homologues and alcoholic bodies. As the percentage of sulphur increases, the product becomes less soluble in alcohol but is still fairly soluble in esters such as methyl or ethyl acetate. However a product made with 300% or 350% of sulphur chloride which has been allowed to stand for several days without washing out the acid is practically completely insoluble in all the common solvents or mixtures of such solvents. It does not dissolve in alcohol or benzol or in mixtures of these nor in ethyl acetate. On the other hand if the resin when freshly made is flooded with the solvent it will be found that such resins made with 250%, 300% or 350% of sulphur chloride will dissolve giving light yellow to light brown solutions which dry to form a hard surface having unusual properties. In preparing the harder resins mixed solvents are generally recommended and are in fact in most cases essential. A 300% or 350% resin (and by that term I mean a resin made with this percentage of sulphur chloride), will not under any conditions dissolve readily in denatured alcohol but when freshly made dissolves quite easily in a mixture of equal parts alcohol and benzol or in a mixture of like proportions of ethyl acetate and chlorbenzol or in acetone and toluol. The proportions of the solvent may be varied considerably and still have desirable solubility as for example one part of the alcohol, ketone or ester to three parts of the hydrocarbon or one part of the latter to three or four parts of the alcoholic body etc. The effect of adding the second solvent is very striking, a turbid solution and suspension of the resin in benzol is immediately cleared by the addition of a little alcohol or a similar suspension in alcohol is cleared by a small amount of benzol.

The softer resins such as the syrupy materials with 100% or so of sulphur chloride may be used in coating compositions where stickiness is desirable as for example in the manufacture of sticky fly paper. They may also be used to impregnate cloth or other textile material to form a preservative medium. The resins of greater consistency such as the 150% or 200% resins may be melted and coated on paper or other surfaces, no solvent being employed. Textile material likewise may be impregnated with such molten solutions. The harder resins generally speaking are however not capable of being handled in this way owing to their high melting point, in fact if they melt at all without decomposition. These resins may however be fluxed with certain materials such as sulphur, especially the plastic form, and other fluxing agents as will be subsequently mentioned. However the particular object of the invention at least in one phase is to produce workable solutions of these higher melting point resins which can be employed as varnishes or as vehicles for pigments or for impregnation purposes to avail of the valuable and unusual properties of the resins which contain a high percentage of sulphur. Hence in the preferred form of the invention the phenol is treated with between 200% and 400% of sulphur chloride and immediately subjected to the action of a composite solvent to bring about solution of such resin. It may be noted that the alcohol, ketone or esters used should be quite free from water if best results are to be obtained in the use of the product as a varnish. Any great amount of water in these solvents causes the surface to ripple or dry unevenly and hence fairly dry solvents should be utilized. This does not mean however that such solvents are necessarily anhydrous but that care should be taken in mixing to see that for example alcohol having water in sufficient amount to cause rippling is not employed.

These products, and especially those made by the action of high percentages of sulfur chlorid on carbolic acid, cresol etc., exhibit properties which are not common to any of the natural resins, (for example, they are not soluble in carbonate or bicarbonate of soda or potash nor do they dissolve in ammonia. In this respect they are decidedly different from shellac which quickly dissolves in such alkalis forming purple solutions. Almost all the natural resins contain enough resin acid to be promptly affected by alkali). Thus solutions of some of these sulphur resins may be applied to wood or other surfaces and allowed to thoroughly dry and then may be exposed to strong solutions of soda or ammonia without being corroded and discolored. Surfaces varnished with such material may therefore be used in kitchens or other places where the wood work is frequently scrubbed with strong soap solutions, washing powders, ammonia and the like. Or the coating may be used in ammonia works or other places where various alkalis are being manufactured or used. Or the solution may be employed to coat tanks or concrete vats etc. to hold mild alkaline solutions. The resin is soluble in caustic soda solutions so that care should be taken that these do not come in contact therewith.

A further desirable property of such high sulphur resin is its resistance to acids, it is not affected by concentrated hydrochloric acid or by either dilute or concentrated sulphuric acid. Concentrated nitric acid discolors the resin but does not act upon it violently. The lack of action of concentrated sulphuric acid on the resin is remarkable: fragments of the resin having been kept at room temperature in this acid for weeks without any change in their appearance or any discoloration of the acid. When the acid is heated to a high temperature it reacts upon the resin forming a blue solution. The low sulphur resins are readily attacked by the acid forming this blue solution. The color of the products formed by the action of the acid vary with the phenolic body from which the resin is made, the foregoing applying to the resinous product made by treatment of high grade phenol.

Wood varnished with the resin and time being given for the solvent to dry out thoroughly so that the latter would not be affected by acid, was flooded with strong sulphuric acid and at the end of several hours the coating was washed and found to be intact, in fact showing just as high a gloss as at the beginning of this test. Shellac is immediately blackened by sulphuric acid and a shellac surface is quickly destroyed. The same applies to many other varnish coatings. It is thus possible with the high sulphur resin to prepare solutions which may be used to coat wood work, metals and the like with a varnish which resists the action of various acids. For example I have coated ordinary letter paper with a solution of the resin, allowed to dry thoroughly and formed the coated paper into a receptacle which would hold concentrated sulphuric acid. In another case paper was coated on one side with the varnish solution and after drying was placed in concentrated sulphuric acid, the latter attacked the paper dissolving it and leaving a glossy film of the resin quite unharmed. Paper which has been well impregnated with the solution so that the fibers are thoroughly covered makes a suitable acid resistant material for wrapping bottles etc. or acid salts. Cloth or burlap may be impregnated with the resin and used for bagging purposes to hold acid sodium sulphate, or to hold superphosphate or other acid fertilizers.

As stated the low sulphur resins are affected by sulphuric acid. Phenol resin made with 100% of sulphur chloride turns blue on contact with the cold concentrated acid, in fact there is more or less action up to about 250% of sulphur chloride. The 300% and 350% products which contain around 60% of combined sulphur are the most resistant and best adapted for operations where concentrated acid is liable to come in contact with a coating or impregnation of this material. However the lower sulphur resins may be used in various ways depending upon the particular acid which is being employed. Hydrochloric acid is resisted by the lower sulphur resins, and a 200% or 250% resin is fairly resistant to the sulphuric acid of around 40% strength ordinarily used in storage batteries. As there are some uses for resin which should be quite plastic instead of brittle it is often desirable to make mixtures of the soft resin and the hard resin which will have a desired plasticity for certain purposes. Plastic sulphur may also be incorporated with the hard resin to soften it. The resin has the property of retaining, to a very considerable degree, sulphur in a plastic condition. When the latter is heated to render plastic and allowed to stand it usually loses its plasticity in several hours but when mixed with for example an equal amount of the resin the plasticity is held indefinitely.

The resin is also fairly resistant to petroleum hydrocarbons and is not dissolved by gasoline or kerosene. If ordinary benzine is added to a solution of the resin in benzol or a mixture of benzol and alcohol the resin is precipitated. This property permits of using the resin as a coating for tanks or articles which come in contact with petroleum oil products. It also makes possible the use of the resin for containers for fats, greases, lard, tallow, butter, etc., or for paper used for wrapping the latter. Thus paper containers may be made up and dipped into a suitable oil solution of the resin to make a oil proof receptacle; or the paper may be coated or impregnated with the resin or a solution of it and made up into a can, box or other package.

The softer and more fusible resins may be deodorized by blowing with air or steam and especially superheated steam, a vacuum being employed if desired. The harder resins may be pulverized and boiled or steamed to wash out excess acid and odoriferous bodies.

In the case of phenol resins as stated, light yellow solutions may be prepared, these in fact closely approximating the color of solutions of bleached shellac. This light yellow color appears ordinarily however only when the resin has an acid reaction. A solution made up from a freshly prepared resin will be acid due to the presence of some hydrochloric acid and usually it is desirable to neutralize such acid. If this is done with soda, borax, oxide of magnesia or other body of generally alkaline properties the light yellow color will change to brown after the acid has been neutralized. While this color is not objectionable for some purposes it is frequently desired to have a light colored solution. In fact in the varnish field, other things being equal, varnishes are usually graded according to their color. Hence in order to maintain the acid reaction and still have present no corrosive acid I prefer to add to the finished solution a small amount of a salt of an organic acid, preferably sodium acetate. This reacts with hydrochloric acid liberating acetic acid which being volatile departs with the solvents in the course of time so that the film contains no corrosive mineral acid and at the most only faint traces of acetic acid. In employing sodium acetate care should be taken that the salt used is neutral or acid as sodium acetate often is found which has alkaline reaction and this will color the solution if used in sufficient quantity. Other salts such as sodium or potassium tartrate, stearate, oxalate and the like may be used but these leave fixed acids in the film which is not always desirable. The acid also may be removed by neutralizing with for example soda ash forming the brown color and then bringing back the color by the addition of enough acetic acid to overcome the alkalinity, and make the solution of substantially neutral or slightly acid reaction.

The solutions may be colored with suitable dyes to give desired shades for purposes of staining, or pigments may be employed which are compatible with such solutions, bearing in mind that while the combined sulphur is in a relatively stable form there is not infrequently a small amount or traces of free sulphur which will react with pigments such as white lead causing them to blacken. For this reason zinc oxide, lithopone and the like are best used as pigments and extending materials such as barytes, silex etc. may be added. As one of the features of certain solutions of this resin is its acid-fast qualities and a pigment may be used which is resistant to acids, such as titanium oxide or similar acidic bodies.

Sometimes when dissolving the resin in for example alcohol, a small amount of hydrogen sulphide is evolved and this may be removed by treatment with lead oxide, zinc hydrate etc. This hydrogen sulphide apparently comes from a trace of impurity in the resin.

While the resin may be prepared as indicated in the foregoing by slowly adding sulphur chloride to the phenol with stirring and cooling; if necessary, solvents may be employed during its preparation in order to allow the agitation to be more effective and to permit of the resin being run out of the container easily. Thus the resin may be prepared by mixing phenol with an equal amount of benzol, adding the sulphur chloride and then in the case of a high sulphur resin adding alcohol or other suitable alcoholic body, thus very quickly preparing the solutions. The latter may be blown with air or neutralized to eliminate the hydrochloric acid and is then ready for use as a varnish coating or for other purposes. In using this method to make the high sulphur resins, the sulphur chloride does not react readily toward the end of the operation and more time or a higher temperature may be required to complete this action. Hence benzol may be too volatile to maintain the requisite temperature and a solvent such as toluol, xylol or solvent naphtha may be used thus allowing the temperature to rise to a higher point and thereby securing more effective combination.

In the foregoing I have mentioned the use of fluxing agents for the high melting point resins. If a 350% resin is strongly heated by itself it does not fuse to a clear liquid but swells and darkens. If a direct flame is applied to a mass of the resin it does not catch fire readily, in fact considering the large amount of sulphur present in the combined form, it seems remarkably uninflammable. Free sulphur is quite quickly ignited by means of a naked flame but I have applied the flame of a Bunsen burner directly to a mass of the phenol resin containing over 60% of sulphur but have been unable to ignite it, the mass intumescing and blackening without flame. When the resin is well mixed with certain fluxing agents it may be melted down to a clear resinous mass. Among suitable fluxing agents are camphor, triphenylphosphate and tricresylphosphate, also the soft sulphur resins and plastic sulphur as noted above. Camphor has a pronounced softening action on the resin, triphenylphosphate is liable to produce resin having a slightly crystalline texture. Tricresylphosphate softens the resin in a manner similar to camphor.

These softened resins may be put into solution in suitable solvents in the same manner as the unfluxed resin. The use of oils such as linseed, cod and castor oil and also of other resins such as the various natural resins or artificial resins made in other ways is not excluded from the field of the present invention.

Soft compositions suitable as pitches to coat the sides of vats or the interior of barrels may be prepared as will be evident from the foregoing. As the resin has a desirable germicidal or insecticidal action it has numerous sanitary applications.

Although the higher sulphur resins are comparatively hard and brittle it may be noted that coatings of the resin on paper show a very satisfactory degree of flexibility. For this purpose 250% resin may be employed with good results or if an acid-fast surface is desired preferably the 300% resin is employed. A solution for this purpose may be made with a solvent composed of equal parts of benzol and denatured alcohol. After making and neutralizing free hydrochloric acid the solution is allowed to stand to deposit any traces of insoluble matter. As noted above the protracted action of hydrochloric acid forms an insoluble resin and this action goes on to some extent while making up the high sulphur resins so that from traces to substantial deposits of the insoluble polymer or whatever it may be are noticed in practically all of the solutions made up from certain of the high sulphur resins. Hence settling or passage through a filter press is desirable in order to produce clear solutions.

In some cases on settling a slight deposit of sulphur is obtained. For example .500 grams of phenol was treated with 1,500 grams of sulphur monochloride, the latter being added gradually and as soon as the resin was prepared it was treated with the following solvent mixture, 625 c. c. benzol, 625 c. c. denatured alcohol and 100 c. c. ethyl acetate. The resin and solvent was heated until the solvent boiled gently. This was continued for three-quarters of an hour with the result that the resin went practically entirely into solution. The color of the solution was light brown and it had considerable body or viscosity. On standing over night a yellow deposit was observed. This was found to be soluble in carbon bisulphide and crystallized therefrom with the characteristic crystalline appearance of sulphur. This deposit burned with a blue flame giving off sulphur fumes. It was supposed that in view of the presence of free sulphur in the solution that the latter would react with lead pigments causing darkening. Such however was not the case. The clear solution was decanted from the sulphur crystals and portions mixed with pigments such as litharge and after standing two weeks no darkening of the pigment was observed. Mixtures also were prepared with pigments the metal base of which does not form black sulphides, e. g. zinc oxide and lithopone. These are likewise unchanged in color. A portion of the same solution was shaken with lead acetate solution and allowed to stand for two weeks at the end of which time the lead acetate solution had changed only very slightly in color being tinted a very light brown.

A quick setting resin solution may be produced by having a non-solvent of the resin present. Turpentine for example will serve or in some cases gasoline may be used. These non-solvents may be added to the extent of say 20 or 25% it more or less depending upon the other solvents employed. For example 300% resin when freshly prepared was ground in water in a ball mill for about 3 hours until the particles of resin were reduced to a state of extreme fineness. This material was then washed thoroughly with water by which means practically all the acid was removed. The resin was thoroughly dried. In this condition the resin will hold its solubility indefinitely. A portion of this resin was dissolved in a mixture of toluol 2 parts by volume, ethyl acetate 2 parts and turpentine 1 part. When this solution is applied to a suitable surface it quickly sets owing to the effect of the non-solvent. The result being an appearance of quick drying. The resin thus set will gradually harden as the solvent evaporates.

The acid-fast resin may be used in the preparation of primers, enamels and mastics, both cold and hot mastics, for such purposes as making acid-resistant tanks or for flooring purposes in buildings where acids are employed.

In the preferred form of the invention the resin employed for acid resistant purposes contains over fifty per cent of combined sulphur and preferably between fifty and seventy per cent, the specific resin best adapted for many uses containing about 60% of sulphur.

Of the "composite solvents" referred to herein, it is to be noted that these may consist of an aromatic hydrocarbon or a derivative thereof, namely a halogenated aromatic hydrocarbon on the one hand, and an alcohol, or ester or ketone (namely of the fatty or aliphatic series) on the other. Such mixture may be embraced in the expression "a liquid aromatic hydrocarbon material and a liquid oxygenated lower aliphatic hydrocarbon derivative." The former, namely "liquid aromatic hydrocarbon material" may embrace benzol, toluol, chlorbenzol etc., while the latter "liquid oxygenated aliphatic hydrocarbon derivative" may include ordinary alcohol, ethyl acetate, acetone etc.

One of the liquid components of a "composite solvent" may serve the other in the capacity of an "assistant," since it assists such other to dissolve the resin. Gasoline, kerosene and like liquids may be termed "non-assisting non-solvent" liquids since such liquids do not have the effect of an "assistant" and may in many instances have the oposite effect, as illustrated in the precipitation of the resin from a solution in alcohol-benzol mixture, by the addition of petroleum hydrocarbon cited.

What I claim is:—

1. A solution of a high-sulphur phenol-sulphur-halide resin in a composite solvent containing a plurality of liquids in each of which such resin is insoluble.

2. A solution comprising sulfur-phenol resin containing not substantially less than 50% sulfur, dissolved in a composite solvent including a liquid aromatic hydrocarbon material and a liquid oxygenated aliphatic hydrocarbon derivative.

3. Sulfur-phenol resin containing about 60% of sulfur dissolved in a composite solvent including a liquid aromatic hydrocarbon material and a liquid oxygenated aliphatic hydrocarbon derivative.

4. A solution of sulfur-phenol resin containing over 50% of sulfur, in a mixed solvent including an aromatic liquid and a liquid alcohol.

5. A coating composition which is fluent at some readily attainable temperature, comprising a sulfur-phenol resin comprising the reaction product of 100 parts of a phenol with at least 100 parts of sulphur chlorid, such composition adapted to produce a somewhat flexible coating when applied to a base.

6. A coating composition which is fluent at some readily attainable temperature, comprising a sulfur-phenol resin containing about 50% of sulfur, such composition being capable of giving a somewhat flexible coating when applied to a base.

7. A coating composition which is fluent at some readily attainable temperature, comprising a sulfur-phenol resin containing between about 50 and about 70% of sulfur, such composition being capable of giving a somewhat flexible coating when applied to a base.

8. A coating composition which is fluent at some readily attainable temperature, comprising a sulfur-phenol resin containing between about 50 and about 70% of sulfur, and another sulfur-phenol resin containing a lower percentage of sulfur than the first mentioned one, such composition being capable of giving a somewhat flexible coating when applied to a base.

9. A coating composition which is fluent at some readily attainable temperature, comprising a sulfur-phenol resin containing about 60% of sulfur and another phenol-sulfur resin containing less than 60% of sulfur, such composition being capable of giving a somewhat flexible coating when applied to a base.

10. A liquid suitable as a coating composition containing a sulfur-phenol resin in a composite solvent including a liquid which is a non-solvent of such resin and another liquid is capable of serving therewith as an assistant, and also containing a non-assisting non-solvent.

11. A process of making a varnish which comprises reacting with sulfur chloride on a phenol, in such proportions as to produce a resin product and hydrochloric acid, separating the resin from the hydrochloric acid within a short time after the formation of the resin, and promptly dissolving the resin in a liquid solvent.

12. A substantially clear solution of a phenol-sulfur-halide resin, which is not readily soluble in any one of the following, namely, alcoholic bodies including methyl alcohol, ethyl alcohol, denatured alcohol, acetone and higher ketones, methyl acetate, ethyl acetate, benzol, homologues of benzol, chlorbenzol; in a composite solvent which includes at least one of the mentioned solvents.

CARLETON ELLIS.